(12) United States Patent
Clevorn et al.

(10) Patent No.: US 9,246,637 B2
(45) Date of Patent: Jan. 26, 2016

(54) COMMUNICATION TERMINAL DEVICE AND METHOD FOR OPERATING A COMMUNICATION TERMINAL DEVICE

(71) Applicant: Intel IP Corporation, Santa Clara, CA (US)

(72) Inventors: Thorsten Clevorn, Munich (DE); Ralph Hasholzner, Munich (DE); Jan Ellenbeck, Munich (DE); Sabine Roessel, Munich (DE)

(73) Assignee: INTEL IP CORPORATION, Santa Clara, CA (US)

( * ) Notice: Subject to any disclaimer, the term of this patent is extended or adjusted under 35 U.S.C. 154(b) by 155 days.

(21) Appl. No.: 14/028,583

(22) Filed: Sep. 17, 2013

(65) Prior Publication Data

US 2015/0078251 A1 Mar. 19, 2015

(51) Int. Cl.
*H04L 1/16* (2006.01)
*H04L 1/18* (2006.01)
*H04L 12/26* (2006.01)

(52) U.S. Cl.
CPC ............... *H04L 1/16* (2013.01); *H04L 1/1822* (2013.01); *H04L 1/1825* (2013.01); *H04L 43/08* (2013.01)

(58) Field of Classification Search
None
See application file for complete search history.

(56) References Cited

U.S. PATENT DOCUMENTS

| 2002/0089959 | A1* | 7/2002 | Fischer et al. | 370/338 |
|---|---|---|---|---|
| 2005/0249120 | A1* | 11/2005 | Heo et al. | 370/236 |
| 2009/0098876 | A1* | 4/2009 | Khan et al. | 455/445 |
| 2009/0216925 | A1* | 8/2009 | Liu | 710/106 |
| 2010/0005357 | A1* | 1/2010 | Sun et al. | 714/749 |
| 2012/0240000 | A1* | 9/2012 | Venkataraj | 714/751 |
| 2013/0279440 | A1* | 10/2013 | Ookubo et al. | 370/329 |
| 2014/0098744 | A1* | 4/2014 | Yucek et al. | 370/328 |
| 2015/0043473 | A1* | 2/2015 | Kim et al. | 370/329 |

OTHER PUBLICATIONS

3GPP TR 36.822 V11.0.0 (Sep. 2012) 3rd Generation Partnership Project, Technical Specification Group Radio Access Network, LTE Radio Access Network (RAN) enhancements for diverse data applications (Release 11), pp. 1-49.

* cited by examiner

*Primary Examiner* — Faruk Hamza
*Assistant Examiner* — Cassandra Decker

(57) ABSTRACT

According to an aspect of this disclosure a communication terminal device is provided, comprising: a transceiver configured to communicate with a communication device according to a retransmission protocol; a controller configured, for a message transmitted from the communication device to the communication terminal device, to at least one of decide, upon a successful receipt of the message from the communication device, if the controller controls the transceiver not to transmit an acknowledgement message which is to be transmitted according to the retransmission protocol; and decide, upon an unsuccessful receipt of the message from the communication device, if the controller controls the transceiver not to transmit a negative acknowledgement message which is to be transmitted according to the retransmission protocol.

20 Claims, 6 Drawing Sheets

COMMUNICATION TERMINAL DEVICE AND METHOD FOR OPERATING A COMMUNICATION TERMINAL DEVICE

TECHNICAL FIELD

Embodiments described herein generally relate to a communication terminal device and a method for operating a communication terminal device.

BACKGROUND

It is the goal of a communication terminal device to receive data in the downlink as fast as possible, i.e., with the highest data rate possible. Due to the form factors e.g. of today's Smartphone's thermal problems like overheating are due to intense activity of the modem of the communication terminal device critical.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION OF EMBODIMENTS

Figure 1:
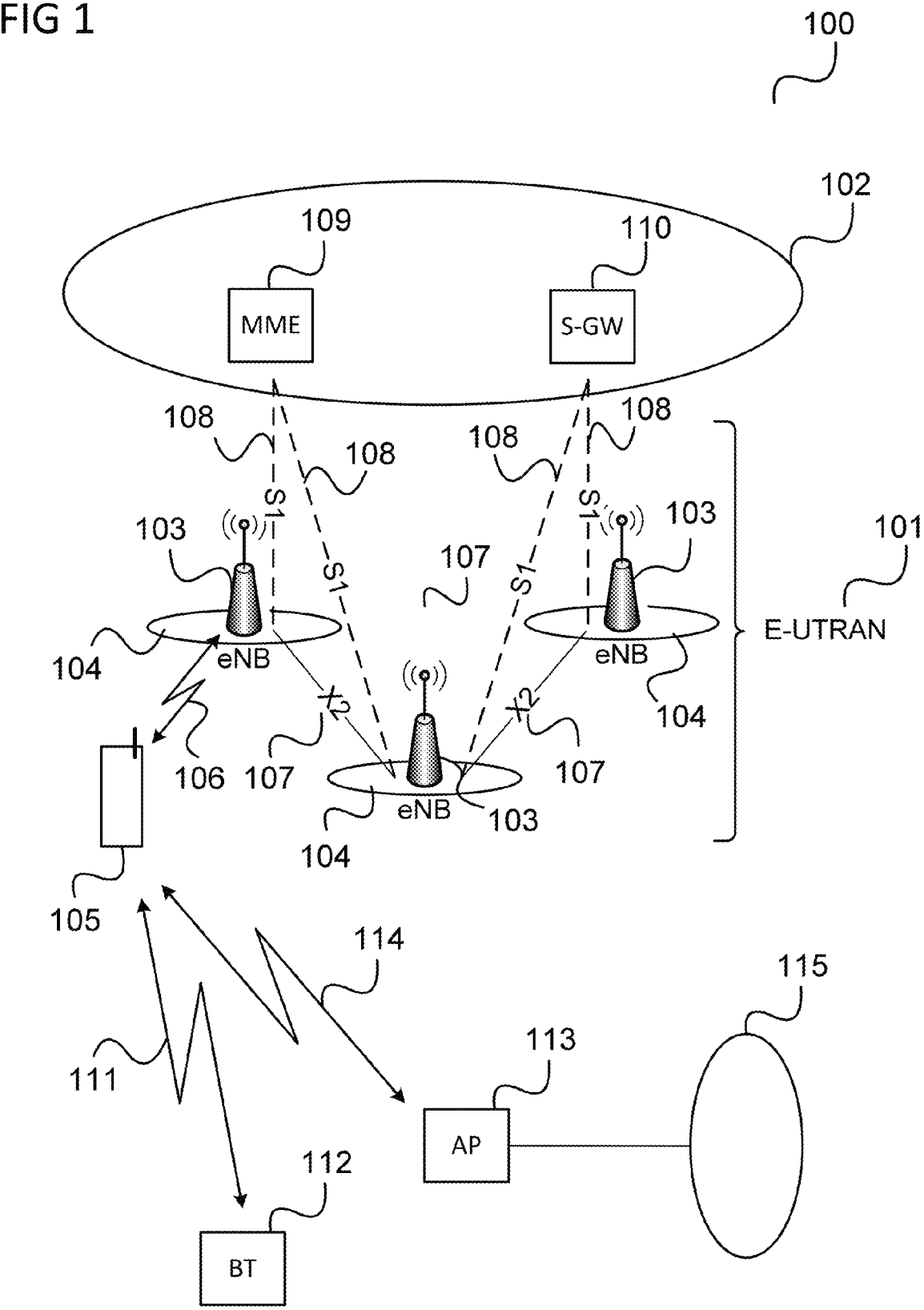
FIG. 1 shows a communication system.

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

The word "exemplary" is used herein to mean "serving as an example, instance, or illustration". Any aspect of this disclosure or design described herein as "exemplary" is not necessarily to be construed as preferred or advantageous over other aspects of this disclosure or designs.

The components, for example a controller of a communication terminal shown in the figures can for example be implemented by one or more circuits.

A "circuit" may be understood as any kind of a logic implementing entity, which may be hardware, software, firmware, or any combination thereof. Thus, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be software being implemented or executed by a processor, e.g. any kind of computer program, e.g. a computer program using a virtual machine code such as, e.g. Java. Any other kind of implementation of the respective functions which will be described in more detail below may also be understood as a "circuit".

3GPP (3rd Generation Partnership Project) has introduced LTE (Long Term Evolution) into the Release 8 version of UMTS (Universal Mobile Telecommunications System) standards.

The air interface of an LTE communication system is called E-UTRA (Evolved Universal Terrestrial Radio Access) and is commonly referred to as '3.9G'. In December 2010, the ITU recognized that current versions of LTE and other evolved 3G technologies that do not fulfill "IMT-Advanced" requirements could nevertheless be considered '4G', provided they represent forerunners to IMT-Advanced and "a substantial level of improvement in performance and capabilities with respect to the initial third generation systems deployed already. LTE is therefore sometime also referred to as '4G' (mainly for marketing reasons).

In comparison with its predecessor UMTS, LTE offers an air interface that has been further optimized for packet data transmission by improving the system capacity and the spectral efficiency. Among other enhancements, the maximum net transmission rate has been increased significantly, namely to 300 Mbps in the downlink transmission direction and to 75 Mbps in the uplink transmission direction. LTE supports scalable bandwidths of from 1.4 MHz to 20 MHz and is based on new multiple access methods, such as OFDMA (Orthogonal Frequency Division Multiple Access)/TDMA (Time Division Multiple Access) in downlink direction (tower, i.e. base station, to handset, i.e. mobile terminal) and SC-FDMA (Single Carrier-Frequency Division Multiple Access)/TDMA in uplink direction (handset to tower). OFDMA/TDMA is a multicarrier multiple access method in which a subscriber (i.e. a mobile terminal) is provided with a defined number of subcarriers in the frequency spectrum and a defined transmission time for the purpose of data transmission. The RF (Radio Frequency) capability of a mobile terminal according to LTE (also referred to as User Equipment (UE), e.g. a cell phone) for transmission and reception has been set to 20 MHz A physical resource block (PRB) is the baseline unit of allocation for the physical channels defined in LTE. It includes a matrix of 12 subcarriers by 6 or 7 OFDMA/SC-FDMA symbols. At the physical layer a pair of one OFDMA/SC-FDMA symbol and one subcarrier is denoted as a 'resource element'. A communication system that is used according to an aspect of this disclosure and which for example a communication system according to LTE is described in the following with reference to FIG. 1.

FIG. 1 shows a communication system 100.

The communication system 100 is a cellular mobile communication system (also referred to as cellular radio communication network in the following) including a radio access network (e.g. an E-UTRAN, Evolved UMTS (Universal Mobile Communications System) Terrestrial Radio Access Network according to LTE (Long Term Evolution)) 101 and a core network (e.g. an EPC, Evolved Packet Core, according LTE) 102. The radio access network 101 may include base (transceiver) stations (e.g. eNodeBs, eNBs, according to LTE) 103. Each base station 103 provides radio coverage for one or more mobile radio cells 104 of the radio access network 101.

A mobile terminal (also referred to as UE, user equipment) 105 located in a mobile radio cell 104 may communicate with the core network 102 and with other mobile terminals 105 via the base station providing coverage in (in other words operating) the mobile radio cell. In other words, the base station 103 operating the mobile radio cell 104 in which the mobile terminal 105 is located provides the E-UTRA user plane terminations including the PDCP (Packet Data Convergence Protocol) layer, the RLC (Radio Link Control) layer and the MAC (Medium Access Control) layer and control plane terminations including the RRC (Radio Resource Control) layer towards the mobile terminal 105.

Control and user data are transmitted between a base station 103 and a mobile terminal 105 located in the mobile radio cell 104 operated by the base station 103 over the air interface 106 on the basis of a multiple access method.

The base stations 103 are interconnected with each other by means of a first interface 107, e.g. an X2 interface. The base stations 103 are also connected by means of a second interface 108, e.g. an S1 interface, to the core network, e.g. to an MME (Mobility Management Entity) 109 via a S1-MME interface and to a Serving Gateway (S-GW) 110 by means of an S1-U interface. The S1 interface supports a many-to-many relation between MMEs/S-GWs 109, 110. The base stations 103, i.e. a base station 103 can be connected to more than one MME/S-GW 109, 110. An MME/S-GW can 109, 110 be connected to more than one base station 103. This enables network sharing in LTE.

For example, the MME 109 may be responsible for controlling the mobility of mobile terminals located in the coverage area of E-UTRAN, while the S-GW 110 is responsible for handling the transmission of user data between mobile terminals 105 and core network 102.

Upon LTE, the radio access network 101, i.e. the E-UTRAN 101 upon LTE, can be seen to consist of the base station 103, i.e. the eNBs 103 upon LTE, providing the E-UTRA user plane (PDCP/RLC/MAC) and control plane (RRC) protocol terminations towards the UE 105.

An eNB 103 may for example host the following functions:
Functions for Radio Resource Management: Radio Bearer Control, Radio Admission Control, Connection Mobility Control, dynamic allocation of resources to UEs 105 in both uplink and downlink (scheduling);
IP header compression and encryption of user data stream;
Selection of an MME 109 at UE 105 attachment when no routing to an MME 109 can be determined from the information provided by the UE 105;
Routing of User Plane data towards Serving Gateway (S-GW) 110;
Scheduling and transmission of paging messages (originated from the MME);
Scheduling and transmission of broadcast information (originated from the MME 109 or O&M (Operation and Maintenance));
Measurement and measurement reporting configuration for mobility and scheduling;
Scheduling and transmission of PWS (Public Warning System, which includes ETWS (Earthquake and Tsunami Warning System) and CMAS (Commercial Mobile Alert System)) messages (originated from the MME 109);
CSG (Closed Subscriber Group) handling.

Each base station of the communication system 100 controls communications within its geographic coverage area, namely its mobile radio cell 104 that is ideally represented by a hexagonal shape. When the mobile terminal 105 is located within a mobile radio cell 104 and is camping on the mobile radio cell 104 (in other words is registered with the mobile radio cell 104) it communicates with the base station 103 controlling that mobile radio cell 104. When a call is initiated by the user of the mobile terminal 105 (mobile originated call) or a call is addressed to the mobile terminal 105 (mobile terminated call), radio channels are set up between the mobile terminal 105 and the base station 103 controlling the mobile radio cell 104 in which the mobile station is located (and on which it is camping). If the mobile terminal 105 moves away from the original mobile radio cell 104 in which a call was set up and the signal strength of the radio channels established in the original mobile radio cell 104 weakens, the communication system may initiate a transfer of the call to radio channels of another mobile radio cell 104 into which the mobile terminal 105 moves.

As the mobile terminal 105 continues to move throughout the coverage area of the communication system 100, control of the call may be transferred between neighboring mobile radio cells 104. The transfer of calls from mobile radio cell 104 to mobile radio cell 104 is termed handover (or handoff).

In addition to the communication via the E-UTRAN 102, the mobile terminal 105 may support communication via a Bluetooth (BT) communication connection 111, for example to another mobile terminal 112 and communication a WLAN communication connection 113 to a WLAN access point (AP) 114. Via the access point 114, the mobile terminal may access a communication network 115 (e.g. the Internet) which may be connected to the core network 102.

For the data transmission LTE uses a modified ARQ error control process called Hybrid automatic repeat request (hybrid ARQ or HARQ), which is a combination of high-rate forward error-correcting coding and ARQ error-control. Automatic Repeat reQuest (ARQ), also known as Automatic Repeat Query is an error-control method for data transmission that uses acknowledgements (messages sent by the receiver indicating that it has correctly received a data frame or packet) and timeouts (specified periods of time allowed to elapse before an acknowledgment is to be received) to achieve reliable data transmission over an unreliable service. ARQ process uses a sliding window protocol, which is a feature of packet-based data transmission protocols. Sliding window protocols are used where reliable in-order delivery of packets is required, such as in the Data Link Layer (OSI model) as well as in the Transmission Control Protocol (TCP).

Figure 2:
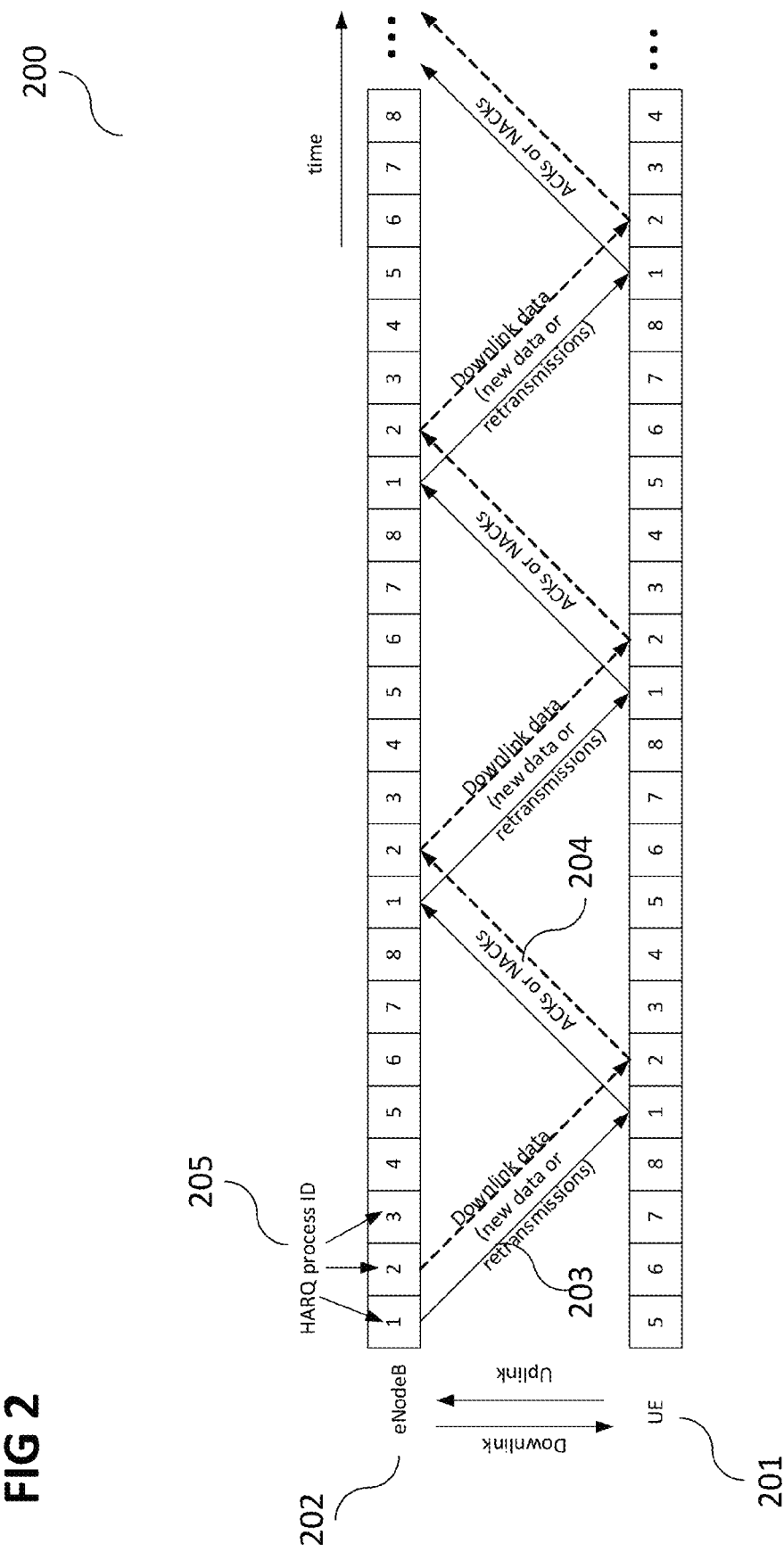
FIG. 2 shows an exemplary scheme for 8 HARQ processes.

This is exemplary illustrated in FIG. 2.

FIG. 2 shows an exemplary scheme 200 for 8 HARQ processes.

In e.g. a wireless network it is almost impossible to guarantee error free transmission. Errors may e.g. occur due to effects of channel fading and interference from neighboring cells. A commonly used approach is to use the ARQ protocol, or for LTE the H-ARQ protocol. The H-ARQ operation is part of the MAC layer, while the PHY layer handles soft combining.

At the receiver 201, in this example at the UE, turbo coding is first applied on the received code blocks. If there is no error detected in the output of the decoder, in generally an ACK signal 203 is fed back to the transmitter 202, in this example the eNodeB, through the PUCCH physical channel and the decoded block is passed to the upper layer; otherwise, an NACK (or NAK) signal 204 is fed back and the received code block is stored in the buffer for subsequent combining.

At the transmitter 202, the eNodeB in this example, for each (re)transmission, the same turbo-encoded data is transmitted with different puncturing, so each of these (re)transmissions has a different redundancy version and each is self-decodable. A typical number of (re)transmissions is, e.g., 4, meaning that one packet in one HARQ process is transmitted (in different HARQ redundancy versions) in total maximum 4 times, the initial transmission and up to 3 retransmissions if the previous (re)transmission was not ACK-ed. There are usually several HARQ processes running in parallel.

As it takes a certain amount of time for the HARQ ACK/NACK to be received and for the system to be ready for retransmit, there is a time interval between two successive HARQ transmissions, which is typically 8 ms in LTE. During this 8 ms, the transport block can either be transmitted (if received with errors) or can be discarded from the transmit buffer (if received without errors). This implies a certain amount of inefficiency in transmission since the transmitter has to wait for 8 ms before it can take any action.

Sliding window protocols are used where reliable in-order delivery of packets is required. Conceptually, each portion of the transmission (packets in most data link layers, but bytes in TCP) is assigned a unique consecutive sequence number, and the receiver uses the numbers to place received packets in the correct order, discarding duplicate packets and identifying missing ones. Although commonly distinguished from the sliding-window protocol, the stop-and-wait ARQ protocol is actually the simplest possible implementation of it. In order to mitigate this issue an N-channel Stop-and-Wait protocol, a variation of the stop-and-wait ARQ protocol, is used for downlink HARQ operation. An N-channel Stop-and-Wait protocol consists of N parallel HARQ processes. In the example shown in FIG. 2 two parallel processes are indicated by a straight line and a dotted line. When one or more processes are busy waiting for the HARQ ACK/NAK, the processes that are free can be used to transmit other transport blocks.

There is one HARQ entity in the eNodeB for each UE that maintains a number of parallel HARQ processes. For the FDD mode, a maximum of eight HARQ processes, shown in FIG. 2 as indicated by the numbers 1 to 8, is allowed in the downlink; for TDD mode the maximum number of HARQ processes in the downlink is in general determined by the UL/DL configuration.

Each HARQ process is associated with an HARQ process ID 205. In the example shown in FIG. 2 the first HARQ process, indicated by a straight line, is associated with HARQ process ID 1 and the second HARQ process, indicated by a dotted line, is associated with HARQ process ID 2.

It is the goal of a UE to receive data in the downlink as fast as possible, i.e., with the highest data rate possible. There are certain scenarios where it is beneficial for the UE if the received data rate is artificially reduced, i.e. throttled. Due to the form factors e.g. of today's Smartphone's thermal problems like overheating are critical. The cellular modem, especially with high TX power, is a significant contributor, equaling the application processor. Therefore, the TX power needs to be controlled also from a thermal point of view, i.e., in critical thermal cases the TX power needs to be reduced.

For the uplink data the modem can do that by reducing the uplink data before it gets transmitted. Then the TX power is reduced. But even when the uplink data is completely stopped, there could be a continuous transmission in the uplink with significant TX power. The modem has no control over the amount of downlink data received from the eNodeB. And due to the HARQ scheme employed it transmits an ACK/NACK for all downlink packets scheduled by the eNodeB. In a cell-edge case or with high uplink interference these ACK/NACKs need to be transmitted with a high TX power. Thus if, e.g., a file download or video stream in the downlink is ongoing, where the UE gets data in every TTI, the UE will transmit with high TX power in every TTI. The boxes marked with the HARQ process IDs 205 represent the TTIs. Thus, there is significant thermal energy created by the modem, which cannot be controlled by the modem itself.

To resolve thermally critical conditions the maximum transmit power level ("tx power throttling") can be derated, by re-using mechanisms established for corner cases, for example low battery voltage, or to resolve SAR violations in certain frequency bands. The drawback of this approach is that it immediately degrades user experience by reducing coverage at the cell edge or in scenarios with high uplink interference.

The modem may for example signal the application processor that it shall enforce the apps generating the downlink traffic to reduce that traffic. But this obviously requires multiple non-standardized interfaces, and it is unclear if the apps react at all, and there is probably a delay and low granularity in throttling. Also, one cannot be sure about the reaction of the eNodeB. The eNodeB may still distribute the reduced data to all TTIs, just with, e.g., less resource blocks per TTI. In this case the ACK/NACK signal would need to be transmitted in every TTI in the uplink and nothing would have changed.

Further, the UE might "fake" a bad reception situation. This would trigger the eNodeB to lower the air interface's potential DL throughput but this might not necessarily successfully throttle the DL traffic of the application, and in particular it could result in a higher amount of UL ACK/NACK (because of more smaller packets), substantially contributing to the UE's thermal problem.

There may be an indicator the UE can transmit to the eNodeB to notify that it may have thermal problems. For LTE there is e.g. a study item (TR 36.822), in which the UE can request by 1 bit a power optimized configuration of the eNodeB. Again, the amount of information conveyed by the UE to the eNodeB will be usually very limited and the eNodeB reaction will not be predictable in a way that the thermal problems of the UE are solved.

Transmitting false/faked ACKs or NACKs would only trigger the eNodeB to transmit another packet in the next TTI of the HARQ process, which requires again the transmission of an ACK or NACK.

Figure 3:
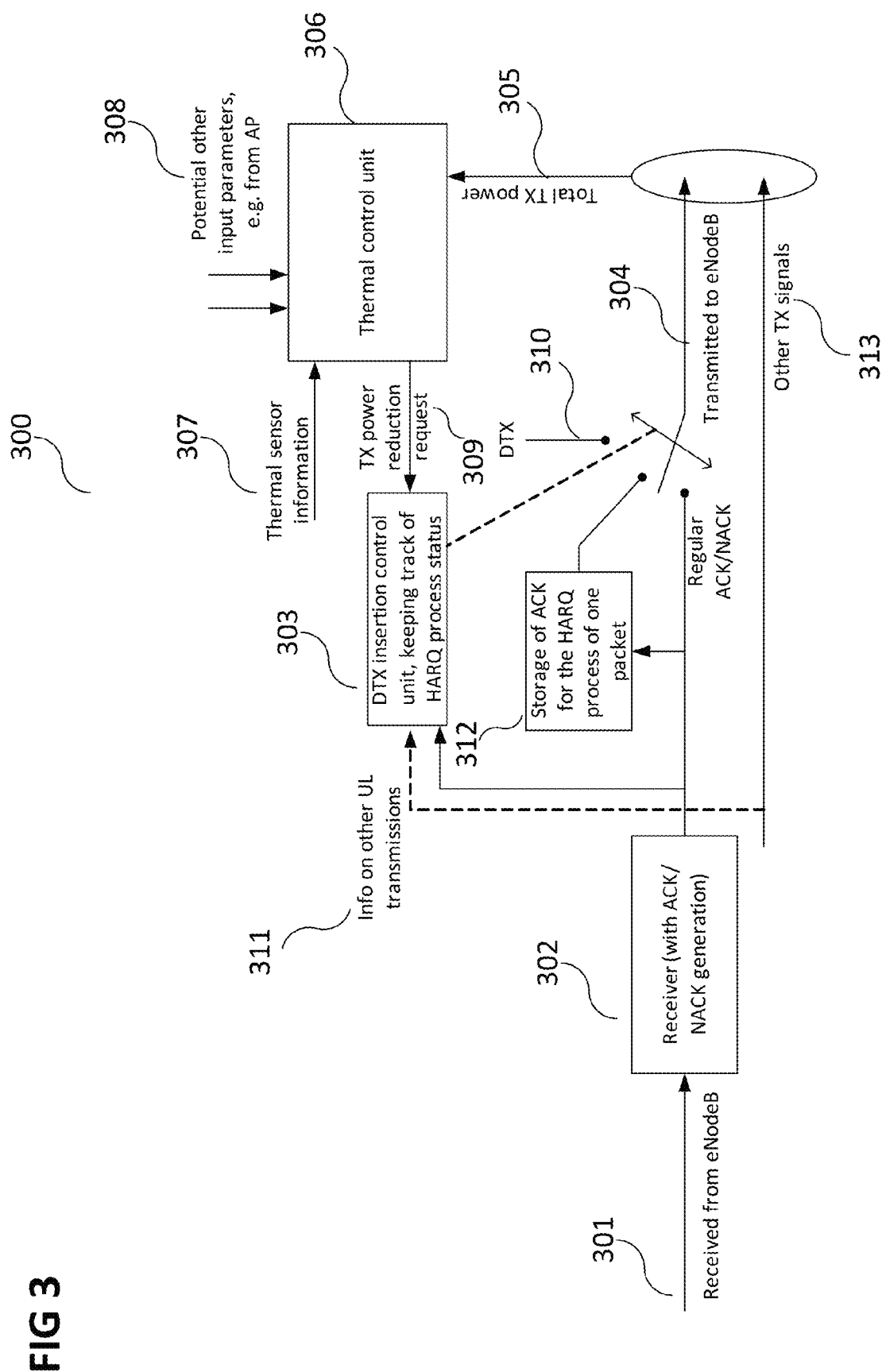
FIG. 3 shows a block diagram.

FIG. 3 shows a block diagram 300 for operating a communication terminal device (UE).

In 301 a receiver 302 receives data from eNodeB. The receiver 302 can generate ACK/NACK signals in response to the received data. In a regular case, i.e. no e.g. thermal issues, a controller 303 can decide that ACK/NACK signals are transmitted in 304 regularly to the eNodeB in response the received data. Information about total transmission power is provided in 305 to a thermal control unit 306. The thermal control unit 306 may decide, based on information from a thermal sensor in 307 and/or based on potential other input parameters in 308 to provide a transmission power reduction request in 309. The controller 303 can decide upon a transmission power reduction request to insert in 310 DTX, i.e. not to send an ACK/NACK signal as expected in response to received data from eNodeB.

The modem may skip the transmission of some ACK/NACKs and not transmit anything instead, i.e., may autonomously decide for DTX. The reaction of the eNodeB to the missing HARQ ACK/NACK may be to treat the DTX as an indication of a failed transmission similar to an explicit NACK. It would then trigger a retransmission at a later point in time. If the UE had not been able to decode the transport block before, it can use the retransmission for another decoding attempt. If the UE had been able to successfully decode at least a part of the payload data the UE may use the retransmission for completion of the transmitted payload data. If the UE already successfully decoded the transport block before, in 312, and passed the payload data to higher layers, it can disregard the retransmission. Until the eNodeB receives an ACK or reaches the maximum number of retransmissions for the HARQ process in question, the eNodeB might not transmit new data on that HARQ process but still holds the current transport block because it assumes this transport block needs to be retransmitted.

The controller 303 may receive in 311 further information of other uplink transmission and keeps track of HARQ process status. The UE can keep an internal bookkeeping to track how many HARQ processes the eNodeB has configured and how many it will see as occupied, i.e., awaiting an ACK. If a UE is not explicitly signaled a maximum number of DL (re)transmissions in advance, the UE can easily determine it, e.g. by looking at past packets, whose HARQ processes were never ACK-ed, or by trying with a single packet by returning always NACKs to the eNodeB. Also, the UE may not be signaled the number of downlink processes the eNodeB will use in advance, but the number of used processes can easily be derived by evaluating the process IDs that have been assigned Depending on how much power the UE wants to save and depending on how much DL rate throttling it wants to tolerate, the UE can choose how often it sends DTX instead of ACK/NACK and for which process IDs. Beyond saving NACK transmissions, the UE could choose an almost arbitrary ratio of DTX and ACKs it generates. However, it should consider possible RAT specific reactions of the eNodeB to the increased number of NACKs (i.e. the DTX-ed ACK/NACKs), for example to make sure not to totally prohibit the delivery of new data by having all available HARQ processes blocked. For that, it has to keep track of how many free HARQ processes the eNodeB has at its disposal (see below). Furthermore the UE has to consider the possible usage of HARQ information for other procedures at the eNodeB, e.g. outer loop link adaptation in eNodeB adapting block size, coding, modulation, number of packets, etc.

It should be noted that the eNodeB should not by itself trigger retransmission on higher layers because this would be requested by the receiving UE if required. Thus, a transport block that was successfully received but never ACK-ed on a HARQ level could still be forwarded to higher layers in the UE protocol stack where its payload could be acknowledged without causing any further retransmissions.

The above example assumes that HARQ feedback transmissions are the only uplink transmissions. However, under normal circumstances, there will typically be other uplink data and control signaling transmission needs (311, 313). These can be combined in an intelligent way with the HARQ throttling framework.

Figure 4:
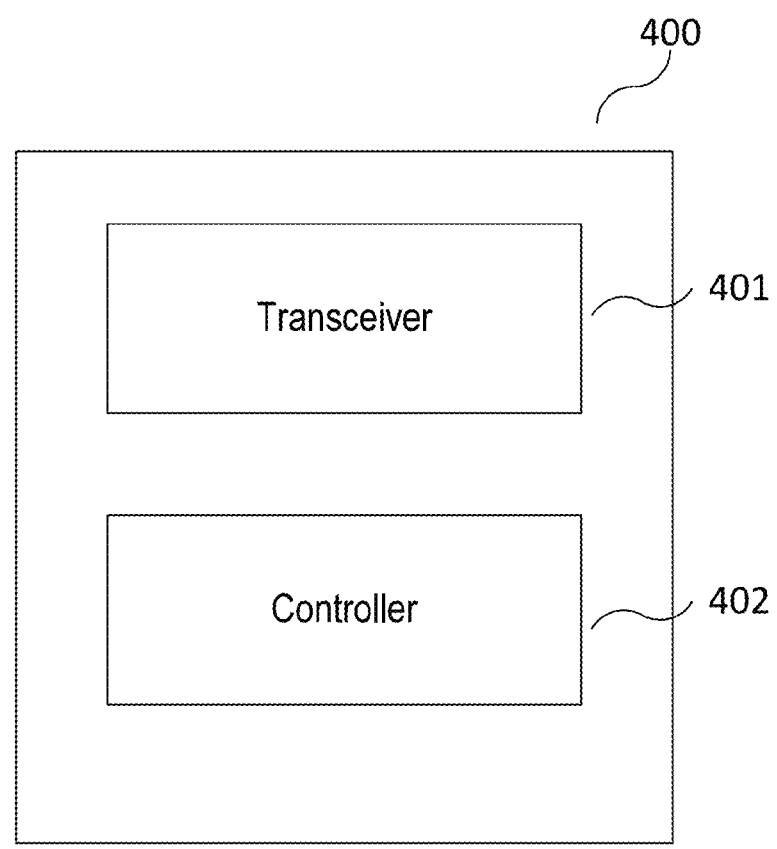
FIG. 4 shows a communication terminal device.

A UE which may for example be operated in the above described manner is shown in FIG. 4.

The following examples pertain to further embodiments.

Example 1, as described with reference to FIG. 4, is a communication terminal device 400, comprising a transceiver 401. The transceiver 401 is configured to communicate with a communication device according to a retransmission protocol. The communication terminal device 400 further includes a controller 402. The controller 402 is configured to decide, upon a successful receipt of the message from the communication device, if it controls the transceiver 401 not to transmit an acknowledgement message to be transmitted according to the retransmission protocol. The controller 402 is configured to decide, upon an unsuccessful receipt of the message from the communication device, if it controls the transceiver 401 not to transmit a negative acknowledgement message to be transmitted according to the retransmission protocol. Instead of transmitting an acknowledgement message upon a successful receipt of the message from the communication device the controller 402 may decide to control the transceiver 401 not to transmit anything. According to the retransmission protocol it is expected to transmit an acknowledgement message in this case. Instead of transmitting a negative acknowledgement message upon an unsuccessful receipt of the message from the communication device the controller 402 may decide to control the transceiver 401 not to transmit anything. According to the retransmission protocol it is expected to transmit a negative acknowledgement message in this case. An unsuccessful receipt may be the reception of no message or the reception of a damaged or incomplete message. The retransmission protocol can for example be at least one of a selective retransmission protocol and a Data Link Layer protocol and a sliding window protocol.

In Example 2, the subject matter of Example 1 can optionally include that the controller is configured, upon a successful receipt of the message from the communication device, to control the transceiver to transmit an acknowledgement message to be transmitted according to the retransmission protocol, at least at the last time the communication device is trying to retransmit the message to the communication terminal device. It should be avoided not to decide to control the transceiver to transmit an acknowledgement message to be transmitted according to the retransmission protocol upon a successful receipt of the message if the message receipt from the communication device is transmitted for the last time and the communication device is not transmitting the message anymore at that level.

In Example 3, the subject matter of any one of Examples 1-2 can optionally include that the controller 402 is configured, upon an unsuccessful receipt of the message from the communication device, to control the transceiver 401 to transmit a negative acknowledgement message to be transmitted according to the retransmission protocol, at least at the last time the communication device is trying to retransmit the message to the communication terminal device.

In Example 4, the subject matter of any one of Examples 1-3 can optionally include that the controller is configured, upon a successful receipt of the message from the communication device, to control the transceiver to transmit an acknowledgement message to be transmitted according to the retransmission protocol if the number of occupied processes provided according to the retransmission protocol exceeds a predetermined threshold. The communication terminal device can keep an internal bookkeeping to track how many retransmission protocol processes the communication device has configured and how many it will see as occupied, i.e., awaiting an ACK, for example to make sure not to totally prohibit the delivery of new data by having all available retransmission protocol processes blocked. For that, it has to keep track of how many free retransmission protocol processes the communication device has at its disposal. Furthermore the communication terminal device has to consider the possible usage of retransmission protocol information for other procedures at the communication device, e.g. outer loop link adaptation in eNodeB adapting block size, coding, modulation, number of packets, etc.

In Example 5, the subject matter of any one of Examples 1-4 can optionally include that the controller is configured, upon an unsuccessful receipt of the message from the communication device, to control the transceiver to transmit a negative acknowledgement message to be transmitted according to the retransmission protocol if the number of occupied processes provided according to the retransmission protocol exceeds a predetermined threshold.

In Example 6, the subject matter of any one of Examples 1-5 can optionally include that the controller is configured whether it controls the transceiver not to transmit an acknowledgement message to be transmitted according to the retransmission protocol upon a successful receipt of the message or whether it controls the transceiver not to transmit a negative acknowledgement message to be transmitted according to the retransmission protocol upon an unsuccessful receipt of the message, based on a predetermined rate. If example for every negative acknowledgement message to be transmitted according to the retransmission protocol upon an unsuccessful receipt of the message and for every second acknowledgement message to be transmitted according to the retransmission protocol upon a successful receipt of the message, for example 50% would be saved, i.e. 3 dB of Tx power. The predetermined ratio may for example be the relation of transmitted acknowledgement messages or transmitted negative acknowledgement messages to not transmitted acknowledgement messages or not transmitted acknowledgement messages. Alternatively the predetermined rate may for example be the rate of saved Tx power.

In Example 7, the subject matter of any one of Examples 1-6 can optionally include that the controller is configured to decide to control the transceiver to transmit an acknowledgement message to be transmitted according to the retransmission protocol upon a successful receipt of the message or to transmit a negative acknowledgement message to be transmitted according to the retransmission protocol upon an unsuccessful receipt of the message, if there is a current data transmission in which the transmission of the message can be included.

In Example 8, the subject matter of any one of Examples 1-7 include that the acknowledgment message is a HARQ ACK message. Alternatively the acknowledgment message may also be an ARQ ACK message or any other kind of acknowledgment message according to a retransmission protocol.

In Example 9, the subject matter of Example 8 can optionally include that the controller is configured to control the transceiver not to send a HARQ ACK message, upon a successful receipt of the message from the communication device for a certain number of retransmissions of the message, to the communication device for which an HARQ ACK message is to be transmitted to the communication device.

In Example 10, the subject matter of any one of Examples 1-8 can optionally include that the negative acknowledgment message is a HARQ NACK message. Alternatively the negative acknowledgment message may also be an ARQ NACK message or any other kind of negative acknowledgment message according to a retransmission protocol.

In Example 11, the subject matter of Example 10 can optionally include that the controller is configured to control the transceiver not to send a HARQ NACK message, upon an unsuccessful receipt of the message from the communication device for a certain number of retransmissions of the message, to the communication device for which an HARQ NACK message is to be transmitted to the communication device.

In Example 12, the subject matter of any one of Examples 1-11 can optionally include a thermal control unit, configured to provide thermal information of the communication terminal device to the controller and the controller may be configured to decide to control the transceiver to transmit a message to the communication device based on the thermal information. The thermal control unit may decide, based on information from e.g. a thermal sensor and/or based on potential other input parameters to provide a transmission power reduction request. The controller can decide upon a transmission power reduction request to insert DTX, i.e. not to send an ACK/NACK signal as expected in response to received message from the communication device. Further, information about total transmission power may be provided to the thermal control unit, wherein the thermal control unit may device based on the total transmission power to insert DTX, i.e. not to send an ACK/NACK signal as expected in response to received message from the communication device.

In Example 13, the subject matter of any one of Examples 1-12 can optionally include a determiner, configured to determine the number how often the communication device is retrying to transmit a message to the communication terminal device and the controller is configured to decide to control the transceiver to transmit a message to the communication device based on the determined number.

In Example 14, the subject matter of any one of Examples 1-13 can optionally include a determiner, configured to determine the number of occupied processes provided according to the retransmission protocol and the controller is configured to decide to control the transceiver to transmit a message to the communication device if the determined number exceeds a predetermined threshold.

In Example 15, the subject matter of any one of Examples 1-14 can optionally include that the communication device is a network communication device. The communication device may be a base station (eNodeB) or likewise.

In Example 16, the subject matter of any one of Examples 1-15 can optionally include that the communication terminal device is a wireless communication terminal device. The communication terminal device may be a wireless user terminal (UE) or likewise.

In Example 17, the subject matter of any one of Examples 1-16 can optionally include that the communication terminal device is a wired communication terminal device. The communication terminal device may be a wired user terminal (UE) or likewise.

The communication terminal device described above in conjunction with FIG. 4 can be operated by a method as described in conjunction with FIG. 5 in the following.

Figure 5:
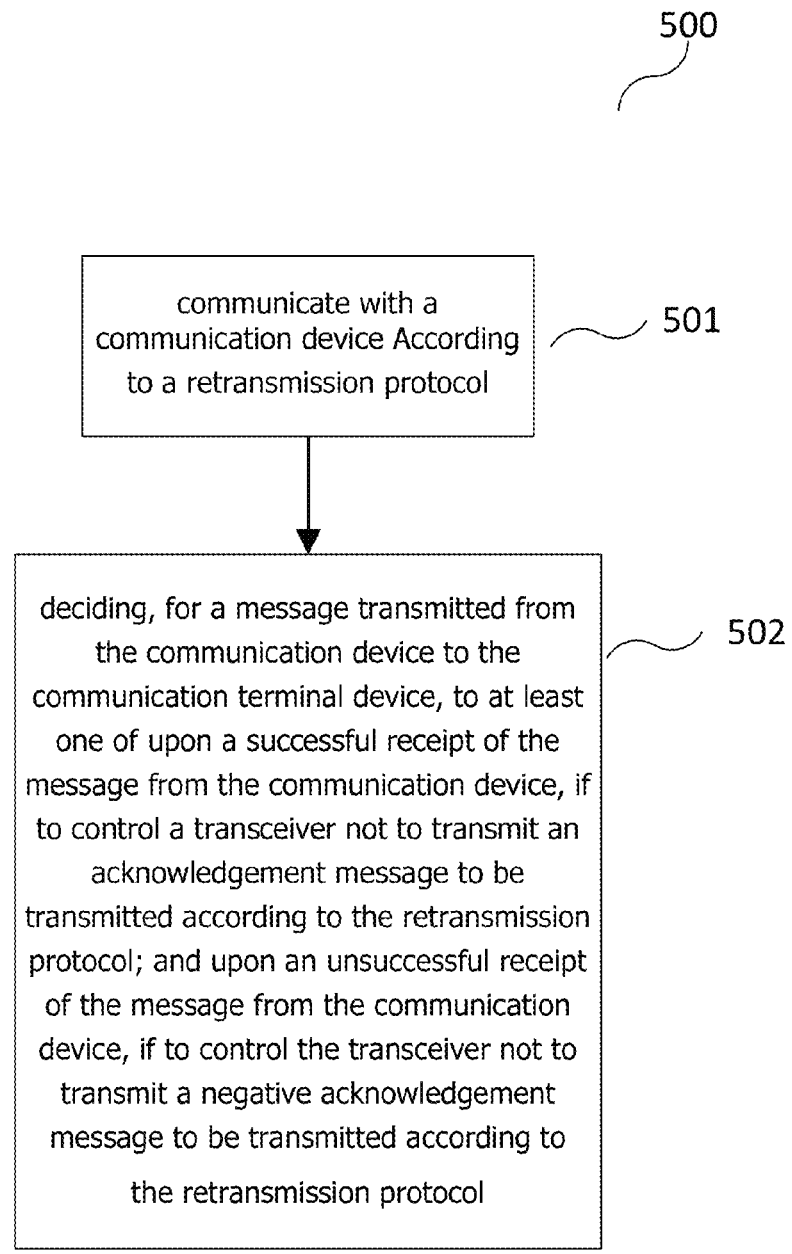
FIG. 5 shows a flow diagram.

FIG. 5 shows a flow diagram 500 illustrating a method for operating a communication terminal device.

Example 18, as described with reference to FIG. 5, is a method for operating a communication terminal device, comprising in 501 the step of communicating with a communication device according to a retransmission protocol. Further the method includes in 502 the step of deciding, for a message transmitted from the communication device to the communication terminal device, at least one of, upon a successful receipt of the message from the communication device, whether to control a transceiver not to transmit an acknowledgement message to be transmitted according to the retransmission protocol; and, upon an unsuccessful receipt of the message from the communication device, whether to control the transceiver not to transmit a negative acknowledgement message to be transmitted according to the retransmission protocol. Instead of transmitting an acknowledgement message upon a successful receipt of the message from the communication device it may be decided to control the transceiver not to transmit anything. According to the retransmission protocol it is expected to transmit an acknowledgement message in this case. Instead of transmitting a negative acknowledgement message upon an unsuccessful receipt of the message from the communication device it may be decided to control the transceiver not to transmit anything. According to the retransmission protocol it is expected to transmit a negative acknowledgement message in this case. An unsuccessful receipt may be the reception of no message or the reception of a damaged or incomplete message. The method described with regard to a retransmission protocol can also be applied to a selective retransmission protocol or a Data Link Layer Protocol or a sliding window protocol.

In Example 19, the subject matter of Example 18 can optionally include the step of controlling, upon a successful receipt of the message from the communication device, the transceiver to transmit an acknowledgement message to be transmitted according to the retransmission protocol, at least at the last time the communication device is trying to retransmit the message to the communication terminal device.

In Example 20, the subject matter of any one of Examples 18-19 can optionally include the step of controlling, upon an unsuccessful receipt of the message from the communication device, the transceiver to transmit a negative acknowledgement message to be transmitted according to the retransmission protocol, at least at the last time the communication device is trying to retransmit the message to the communication terminal device.

In Example 21, the subject matter of any one of Examples 18-20 can optionally include the step of controlling, upon a successful receipt of the message from the communication device, the transceiver to transmit an acknowledgement message to be transmitted according to the retransmission protocol if the number of occupied processes provided according to the retransmission protocol exceeds a predetermined threshold.

In Example 22, the subject matter of any one of Examples 18-21 can optionally include further comprising the step of controlling, upon an unsuccessful receipt of the message from the communication device, the transceiver to transmit a negative acknowledgement message to be transmitted according to the retransmission protocol if the number of occupied processes provided according to the retransmission protocol exceeds a predetermined threshold.

In Example 23, the subject matter of any one of Examples 18-22 can optionally include the step of controlling the transceiver not to transmit an acknowledgement message to be transmitted according to the retransmission protocol upon a successful receipt of the message or controlling the transceiver not to transmit a negative acknowledgement message to be transmitted according to the retransmission protocol upon an unsuccessful receipt of the message, based on a predetermined ratio.

In Example 24, the subject matter of any one of Examples 18-23 can optionally include the step of deciding to control the transceiver to transmit an acknowledgement message to be transmitted according to the retransmission protocol upon a successful receipt of the message or to transmit a negative acknowledgement message to be transmitted according to the retransmission protocol upon an unsuccessful receipt of the message, if there is a current data transmission in which the transmission of the message can be included.

In Example 25, the subject matter of any one of Examples 18-24 can optionally include that the acknowledgment message is a HARQ ACK message.

In Example 26, the subject matter of Example 25 can optionally include the step of controlling the transceiver not to send a HARQ ACK message, upon a successful receipt of the message from the communication device for a certain number of retransmissions of the message, to the communication device for which an HARQ ACK message is to be transmitted to the communication device.

In Example 27, the subject matter of any one of Examples 18-25 can optionally include that the negative acknowledgment message is a HARQ NACK message.

In Example 28, the subject matter of Example 27 can optionally include the step of controlling the transceiver not to send a HARQ NACK message, upon an unsuccessful receipt of the message from the communication device for a certain number of retransmissions of the message, to the communication device for which an HARQ NACK message is to be transmitted to the communication device.

In Example 29, the subject matter of any one of Examples 18-28 can optionally include the step of providing thermal information of the communication terminal device to the controller and the step of deciding to control the transceiver to transmit a message to the communication device based on the thermal information.

In Example 30, the subject matter of any one of Examples 18-29 can optionally include the step of determining the number how often the communication device is retrying to transmit a message to the communication terminal device and the step of deciding to control the transceiver to transmit a message to the communication device based on the determined number.

In Example 31, the subject matter of any one of Examples 18-30 can optionally include the step of determining the number of occupied processes provided according to the retransmission protocol and the step of deciding to control the transceiver to transmit a message to the communication device if the determined number exceeds a predetermined threshold.

The method described above in conjunction with FIG. 5 may also be applied to operate a communication terminal device described in conjunction with FIG. 6 in the following.

Figure 6:
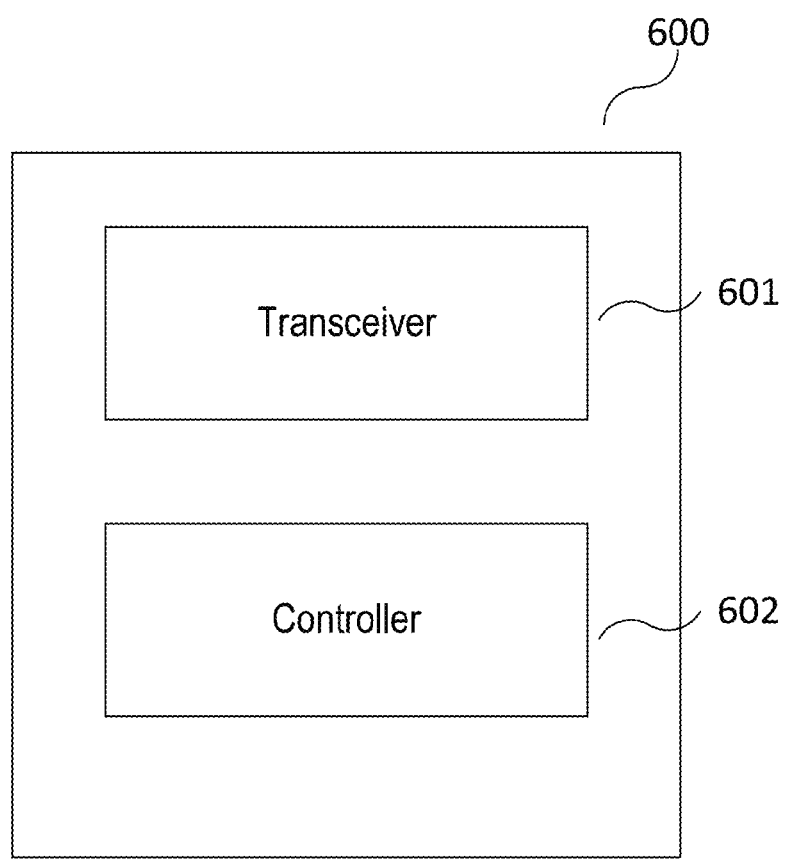
FIG. 6 shows a further communication terminal device.

Example 32, as described with reference to FIG. 6, is a communication terminal device 600 comprising a transceiver 601 configured to communicate with a communication device in accordance with a retransmission protocol. The communication terminal device further includes a controller 602 configured, for a message transmitted from the communication device to the communication terminal device, to at least one of decide, upon a successful receipt of the message from the communication device, if the controller controls the transceiver not to transmit an acknowledgement message to be transmitted according to the retransmission protocol; and decide, upon an unsuccessful receipt of the message from the communication device, if the controller controls the transceiver not to transmit a negative acknowledgement message to be transmitted according to the retransmission protocol, to selectively suppress the transmission of messages to the communication device for reducing used transmission power.

In Example 33, the subject matter of Example 32 can optionally include that the controller is configured, upon an unsuccessful receipt of the message from the communication device, to control the transceiver to transmit a negative acknowledgement message to be transmitted according to the retransmission protocol, at least at the last time the communication device is trying to retransmit the message to the communication terminal device.

In Example 34, the subject matter of any one of Examples 32-33 can optionally include that wherein the controller is configured, upon a successful receipt of the message from the communication device, to control the transceiver to transmit an acknowledgement message to be transmitted according to the retransmission protocol if the number of occupied processes provided according to the retransmission protocol exceeds a predetermined threshold.

In Example 35, the subject matter of any one of Examples 32-34 can optionally include that the controller is configured, upon an unsuccessful receipt of the message from the communication device, to control the transceiver to transmit a negative acknowledgement message to be transmitted according to the retransmission protocol if the number of occupied processes provided according to the retransmission protocol exceeds a predetermined threshold.

In Example 36, the subject matter of any one of Examples 32-35 can optionally include that the controller is configured if the controller controls the transceiver not to transmit an acknowledgement message to be transmitted according to the retransmission protocol upon a successful receipt of the message or if the controller controls the transceiver not to transmit a negative acknowledgement message to be transmitted according to the retransmission protocol upon an unsuccessful receipt of the message, based on a predetermined ratio.

In Example 37, the subject matter of any one of Examples 32-36 can optionally include that the controller is configured to decide to control the transceiver to transmit an acknowledgement message to be transmitted according to the retransmission protocol upon a successful receipt of the message or to transmit a negative acknowledgement message to be transmitted according to the retransmission protocol upon an unsuccessful receipt of the message, if there is a current data transmission in which the transmission of the message can be included.

In Example 38, the subject matter of any one of Examples 32-37 can optionally include that the acknowledgment message is a HARQ ACK message.

In Example 39, the subject matter of Example 38 can optionally include that the controller is configured to control the transceiver not to send a HARQ ACK message, upon a successful receipt of the message from the communication device for a certain number of retransmissions of the message, to the communication device for which an HARQ ACK message is to be transmitted to the communication device.

In Example 40, the subject matter of any one of Examples 32-37 can optionally include that the negative acknowledgment message is a HARQ NACK message.

In Example 41, the subject matter of Example 40 can optionally include that the controller is configured to control the transceiver not to send a HARQ NACK message, upon an unsuccessful receipt of the message from the communication device for a certain number of retransmissions of the message, to the communication device for which an HARQ NACK message is to be transmitted to the communication device.

In Example 42, the subject matter of any one of Examples 32-41 can optionally include a thermal control unit, configured to provide thermal information of the communication terminal device to the controller and the controller is configured to decide to control the transceiver to transmit a message to the communication device based on the thermal information.

In Example 43, the subject matter of any one of Examples 32-42 can optionally include a determiner, configured to determine the number how often the communication device is retrying to transmit a message to the communication terminal device and the controller is configured to decide to control the transceiver to transmit a message to the communication device based on the determined number.

In Example 44, the subject matter of any one of Examples 32-43 can optionally include a determiner, configured to determine the number of occupied processes provided according to the retransmission protocol and the controller is configured to decide to control the transceiver to transmit a message to the communication device if the determined number exceeds a predetermined threshold.

Example 34 is a communication terminal device comprising: means for communicating with a communication device according to a retransmission protocol; means, for a message transmitted from the communication device to the communication terminal device, to at least one of decide, upon a successful receipt of the message from the communication device, whether the means controls the transceiver not to transmit an acknowledgement message to be transmitted according to the retransmission protocol; and decide, upon an unsuccessful receipt of the message from the communication device, whether the means controls the transceiver not to transmit a negative acknowledgement message to be transmitted according to the retransmission protocol.

In Example 35, the subject matter of Example 34 can optionally include means, upon a successful receipt of the message from the communication device, for controlling the transceiver to transmit an acknowledgement message to be transmitted according to the retransmission protocol, at least at the last time the communication device is trying to retransmit the message to the communication terminal device.

In Example 36, the subject matter of any one of the Examples 34-35 can optionally include means, upon an unsuccessful receipt of the message from the communication device, for controlling the transceiver to transmit a negative acknowledgement message to be transmitted according to the retransmission protocol, at least at the last time the communication device is trying to retransmit the message to the communication terminal device.

In Example 37, the subject matter of any one of the Examples 34-36 can optionally include means, upon a successful receipt of the message from the communication device, for controlling the transceiver to transmit an acknowledgement message to be transmitted according to the retransmission protocol if the number of occupied processes provided according to the retransmission protocol exceeds a predetermined threshold.

In Example 38, the subject matter of any one of the Examples 34-37 can optionally include means, upon an unsuccessful receipt of the message from the communication device, for controlling the transceiver to transmit a negative acknowledgement message to be transmitted according to the retransmission protocol if the number of occupied processes provided according to the retransmission protocol exceeds a predetermined threshold.

In Example 39, the subject matter of any one of the Examples 34-38 can optionally include means for controlling means not to transmit an acknowledgement message to be transmitted according to the retransmission protocol upon a successful receipt of the message or for controlling means not to transmit a negative acknowledgement message to be transmitted according to the retransmission protocol upon an unsuccessful receipt of the message, based on a predetermined ratio.

In Example 40, the subject matter of any one of the Examples 34-39 can optionally include means for deciding to control means to transmit an acknowledgement message to be transmitted according to the retransmission protocol upon a successful receipt of the message or to transmit a negative acknowledgement message to be transmitted according to the retransmission protocol upon an unsuccessful receipt of the message, if there is a current data transmission in which the transmission of the message can be included.

In Example 41, the subject matter of any one of the Examples 34-40 can optionally include that the acknowledgment message is a HARQ ACK message.

In Example 42, the subject matter of Example 41 can optionally include means for controlling means not to send a HARQ ACK message, upon a successful receipt of the message from the communication device for a certain number of retransmissions of the message, to the communication device for which an HARQ ACK message is to be transmitted to the communication device.

In Example 43 the subject matter of any one of the Examples 34-42 can optionally include that the negative acknowledgment message is a HARQ NACK message.

In Example 44, the subject matter of Example 43 can optionally include means for controlling means not to send a HARQ NACK message, upon an unsuccessful receipt of the message from the communication device for a certain number of retransmissions of the message, to the communication device for which an HARQ NACK message is to be transmitted to the communication device.

In Example 45, the subject matter of any one of the Examples 34-44 can optionally include means for providing thermal information of the communication terminal device to means and comprising means for deciding to control means to transmit a message to the communication device based on the thermal information.

In Example 46, the subject matter of any one of the Examples 34-45 can optionally include means for determining the number how often the communication device is retrying to transmit a message to the communication terminal device and comprising means for deciding to control means to transmit a message to the communication device based on the determined number.

In Example 47, the subject matter of any one of the Examples 34-46 can optionally include means for determining the number of occupied processes provided according to the retransmission protocol and comprising means for deciding to control means to transmit a message to the communication device if the determined number exceeds a predetermined threshold.

In Example 48, the subject matter of any one of the Examples 34-47 can optionally include that the communication device is a network communication device.

In Example 49, the subject matter of any one of the Examples 34-48 can optionally include that the communication terminal device is a wireless communication terminal device.

In Example 50, the subject matter of any one of the Example 34-49 can optionally include that the communication terminal device is a wired communication terminal device.

It should be noted that one or more of the features of any of the examples above may be combined with any one of the other examples.

As an example, if the communication terminal device (or UE) with the help of the proposed mechanism replaces every NACK and every second ACK with a DTX, it would save at least 50%, i.e. 3 dB, of uplink transmission time intervals or, if it only transmits every $4^{th}$ ACK, it would reduce the Tx power by at least 6 dB if the HARQ feedback was the only uplink transmission. This is a very significant help in critical thermal scenarios which has to be paid for with an according drop in the achieved downlink throughput. Of course, the modem could adjust the number of ACK/NACKs it does not transmit with a high granularity (perhaps even DTX all ACK/NACKs for one packet), to match precisely the needed average TX power reduction. Meaning that if the thermal control unit has different levels of warnings or requests the modem can adjust to that and balance the performance impact vs. the TX power reduction.

Assuming the critical thermal situation, which is exemplarily assumed to trigger the above described method to operate a communication terminal device, other user uplink data has probably already been reduced or stopped by some other mechanism. Important link critical information like handover requests may still be (irregularly) transmitted as keeping the link alive is most critical for user experience. In any case, if there is other data transmitted, the DTX-ing of ACK/NACKs may be suspended for this time as the TX is on anyway, which means the additional thermal energy of the ACK/NACK transmission is very small due to the other transmissions.

The disclosed method and communication terminal device may make inefficient use of the network cellular link resources. But it is mostly targeted at emergency situations (like overheating of the device), which otherwise would end in a connection loss/call drop (because the modem is completely shut off by the thermal control). Thus, it prevents the most annoying singular event for the end user. The disclosed method uses the available mechanisms of the HARQ process framework.

Upon MIMO spatial multiplexing HARQ processes may have room for several transport blocks that can be acknowledged independently. The extension of the disclosed method and communication terminal device to the use of multiple transport blocks may be applied to the above described method and communication terminal device.

While the communication terminal device and method for operating a communication terminal device is described in conjunction with LTE, it should be understood that LTE is only an example and the disclosed communication terminal device and method for operating a communication terminal device can also be applied to other wireless radio access technologies like e.g. UMTS/3G, WLAN, but not limited thereto, or wired communication technologies.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A communication terminal device comprising:
a transceiver configured to communicate with a communication device according to a retransmission protocol;
a controller configured to, at least one of:
upon a successful receipt of a message from the communication device, make a decision based on a needed reduction of transmission power whether or not to transmit an acknowledgement message according to the retransmission protocol; and
upon an unsuccessful receipt of the message from the communication device, make a decision based on the needed reduction of transmission power whether or not to transmit a negative acknowledgement message according to the retransmission protocol.

2. The communication terminal device according to claim 1, wherein the controller is configured, upon the successful receipt of the message from the communication device and based on the decision, to control the transceiver to transmit the acknowledgement message according to the retransmission protocol, at the last time the communication device is trying to retransmit the message to the communication terminal device.

3. The communication terminal device according to claim 1, wherein the controller is configured, upon the unsuccessful receipt of the message from the communication device and based on the decision, to control the transceiver to transmit the negative acknowledgement message according to the retransmission protocol, at the last time the communication device is trying to retransmit the message to the communication terminal device.

4. The communication terminal device according to claim 1, wherein the controller is configured, upon the successful receipt of the message from the communication device and based on the decision, to control the transceiver to transmit the acknowledgement message according to the retransmission protocol if the number of active processes associated with the retransmission protocol on the communication terminal device exceeds a predetermined threshold.

5. The communication terminal device according to claim 1,
wherein the decision based on the needed reduction of transmission power is based on a predetermined ratio.

6. The communication terminal device according to claim 1, wherein the decision based on the needed reduction of transmission power is based on whether there is a current data transmission in which the transmission of the message can be included.

7. The communication terminal device according to claim 1, wherein the acknowledgment message is a HARQ ACK message.

8. The communication terminal device according to claim 7, wherein based on the decision the controller is configured to control the transceiver not to send a HARQ ACK message upon the successful receipt of the message from the communication device for a certain number of retransmissions of the message from the communication device.

9. The communication terminal device according to claim 1, wherein the negative acknowledgment message is a HARQ NACK message.

10. The communication terminal device according to claim 9, wherein based on the decision the controller is configured to control the transceiver not to send a HARQ NACK message upon the unsuccessful receipt of the message from the communication device for a certain number of retransmissions of the message, from the communication device.

11. The communication terminal device according to claim 1, further comprising a thermal control unit, configured to provide thermal information of the communication terminal device to the controller and the controller is configured to determine the needed reduction of transmission power based on the thermal information.

12. The communication terminal device according to claim 1, comprising a determiner configured to determine a number of how often the communication device is retrying to transmit the message to the communication terminal device and, based on the needed reduction of transmission power, the controller is configured to decide whether to control the transceiver to transmit the message to the communication device based on the determined number.

13. The communication terminal device according to claim 1, comprising a determiner configured to determine the number of active processes associated with the retransmission protocol on the communication terminal device and, based on the decision, the controller is configured to control the transceiver to transmit the acknowledgement or the negative acknowledgement message to the communication device if the determined number exceeds a predetermined threshold.

14. The communication terminal device according to claim 1, wherein the communication device is a network communication device.

15. The communication terminal device according to claim 1, wherein the communication terminal device is a wireless communication terminal device.

16. The communication terminal device according to claim 1, wherein the communication terminal device is a wired communication terminal device.

17. The communication terminal device according to claim 1, wherein the decision based on the needed reduction of transmission power is to selectively suppress the transmission of the acknowledgement message or the negative acknowledgement message to the communication device for reducing used transmission power.

18. The communication terminal device according to claim 17, wherein the controller is configured, upon the unsuccessful receipt of the message from the communication device and based on the decision, to control the transceiver to transmit the negative acknowledgement message according to the retransmission protocol at the last time the communication device is trying to retransmit the message to the communication terminal device.

19. A method for operating a communication terminal device, comprising the steps of:
configuring a transceiver to communicate with a communication device according to a retransmission protocol;
configuring a controller to at least one of:
upon a successful receipt of a message from the communication device, make a decision based on a needed reduction of transmission power whether or not to transmit an acknowledgement message according to the retransmission protocol; and
upon an unsuccessful receipt of a message from the communication device, make a decision based on the needed reduction of transmission power whether or not to transmit a negative acknowledgement message according to the retransmission protocol.

20. The method according to claim 19,
further comprising the step of controlling, upon the successful receipt of the message from the communication device and based on the decision, the transceiver to transmit the acknowledgement message according to the retransmission protocol upon the successful receipt of the message, at the last time the communication device is trying to retransmit the message to the communication terminal device.

* * * * *